US006780141B1

(12) United States Patent
Kao et al.
(10) Patent No.: US 6,780,141 B1
(45) Date of Patent: Aug. 24, 2004

(54) METHOD AND SYSTEM FOR REDUCING TIP-OUT OSCILLATION EFFECTS IN AN AUTOMATIC TRANSMISSION

(75) Inventors: Chi-Kuan Kao, Troy, MI (US); Anthony L. Smith, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/358,098

(22) Filed: Feb. 4, 2003

(51) Int. Cl.[7] .................................................. F16H 61/26
(52) U.S. Cl. ........................................ 477/164; 477/176
(58) Field of Search ................................ 477/156, 164, 477/176

(56) References Cited

U.S. PATENT DOCUMENTS 4,724,939 A * 2/1988 Lockhart et al. ............. 192/3.3
5,842,953 A * 12/1998 Yasue et al. ................ 477/174
5,908,095 A 6/1999 Jackel et al. ............. 192/70.17
6,386,351 B1 5/2002 Salecker et al. ........... 192/54.1
6,468,183 B1 10/2002 O'Neil et al. .............. 477/107

* cited by examiner

*Primary Examiner*—Dirk Wright
(74) *Attorney, Agent, or Firm*—Kathryn A. Marra

(57) ABSTRACT

A method for reducing oscillation in an automotive transmission system includes detecting a tip-out of an accelerator pedal position. Responsive to the detected tip-out, a pressure command is adjusted for a selected range clutch within the transmission system so as to reduce the pressure of the selected range clutch from a normal pressure level to a low pressure level, thereby producing a desired gear train slip in the transmission system. Then, the pressure command of the selected range clutch is re-adjusted after a determined period of time at the low pressure level so as to increase the pressure of the selected range clutch from the low pressure level, and thereby eliminating the gear train slip.

16 Claims, 16 Drawing Sheets

METHOD AND SYSTEM FOR REDUCING TIP-OUT OSCILLATION EFFECTS IN AN AUTOMATIC TRANSMISSION

BACKGROUND

The present disclosure relates generally to vehicle transmission systems and, more particularly, to a method and system for reducing tip-out oscillation effects in a clutch-to-clutch shift, electronically controlled automatic transmission.

In a vehicle equipped with an automatic transmission, the torque generated by the engine is transmitted to the vehicle mass through various mechanical components within the transmission. For example, FIG. 1*a* is a schematic diagram illustrating an existing transmission system 100, in which a pair of range clutches (Clutch 2 and Clutch 3) within a planetary gear device are engaged in order to provide a transmission input/output speed ratio having a value "r" that is not equal to 1 (i.e., any gear ratio other than a direct drive ratio). In addition, Clutch 3 is shown grounded to the transmission case 102 through a freewheeler 104. In the case where the transmission system 100 is configured in a direct drive ratio, as illustrated in FIG. 1*b*, a different pair of range clutches (Clutch 2 and Clutch 4) within the planetary gear device are engaged to provide a direct drive ratio. Although there is a freewheeler 106 shown associated with Clutch 4, it is not grounded to the transmission case.

An accelerator pedal "tip-out" maneuver refers to the action of a driver releasing the pedal from a depressed position to a zero or near zero position (i.e., nearly or completely released). Subsequent to such a maneuver, the vehicle engine's output torque is abruptly decreased. Through the use of freewheeler devices 104 (FIG. 1*a*) and 106 (FIG. 1*b*), the effects of an abrupt decrease in output torque (e.g., excitation/oscillation of the driveline) are prevented from being transmitted through the range clutches and exciting the axle 108. This type of transmission system is also referred to as a "freewheeler-to-clutch" shift transmission.

On the other hand, the use of freewheeler devices increases the overall cost of the transmission systems. Accordingly, in a conventional "clutch-to-clutch" shift transmission system, the freewheeler devices are eliminated such that the gear train is fully locked if there is no gear shifting. However, in this configuration, an abrupt engine torque decrease can excite the driveline without a freewheeler connected to one or more of the range clutches. Although a driveline oscillation due to tip-out may be relatively innocuous where the torque converter 110 functions as a damper without locking up the torque converter clutch (Clutch 1), it can pose a more serious problem if the torque converter clutch is fully locked or, alternatively, if there is no torque converter in the system and Clutch 1 is instead used as a starting device. Therefore, it is also desirable to be able to reduce the effects of tip-out oscillation in a clutch-to-clutch shift transmission system that does not utilize freewheeler devices.

SUMMARY

In an exemplary embodiment, a method for reducing oscillation in an automotive transmission system includes detecting a tip-out of an accelerator pedal position. Responsive to the detected tip-out, a pressure command is adjusted for a selected range clutch within the transmission system so as to reduce the pressure of the selected range clutch from a normal pressure level to a low pressure level, thereby producing a desired gear train slip in the transmission system. Then, the pressure command of the selected range clutch is re-adjusted after a determined period of time at the low pressure level so as to increase the pressure of the selected range clutch from the low pressure level, and thereby eliminating the gear train slip.

In another aspect, a system for reducing oscillation in an automotive transmission system includes a sensing means for detecting a tip-out of an accelerator pedal position. A controller adjusts a pressure command for a selected range clutch within the transmission system, in response to the detected tip-out, so as to reduce the pressure of the selected range clutch from a normal pressure level to a low pressure level, thereby producing a desired gear train slip in the transmission system. The controller re-adjusts the pressure command of the selected range clutch after a determined period of time at the low pressure level so as to increase the pressure of the selected range clutch from the low pressure level, and thereby eliminating the gear train slip.

BRIEF DESCRIPTION OF THE DRAWINGS

Referring to the exemplary drawings wherein like elements are numbered alike in the several Figures.

DETAILED DESCRIPTION

Disclosed herein is a method and system for reducing tip-out oscillation effects in a clutch-to-clutch shift, electronically controlled automatic transmission. Broadly stated, the method utilizes a set of algorithms to actively control one or more range clutches to function as a freewheeler during the detection of an initial tip-out condition by reducing the applied range clutch pressure for a transient period of time, thus producing a controlled slip. In this manner, any potential excitation effects of the driveline are reduced, and the full clutch pressure is returned in accordance with the normal shifting operation of automatic transmission.

Figure 1A:
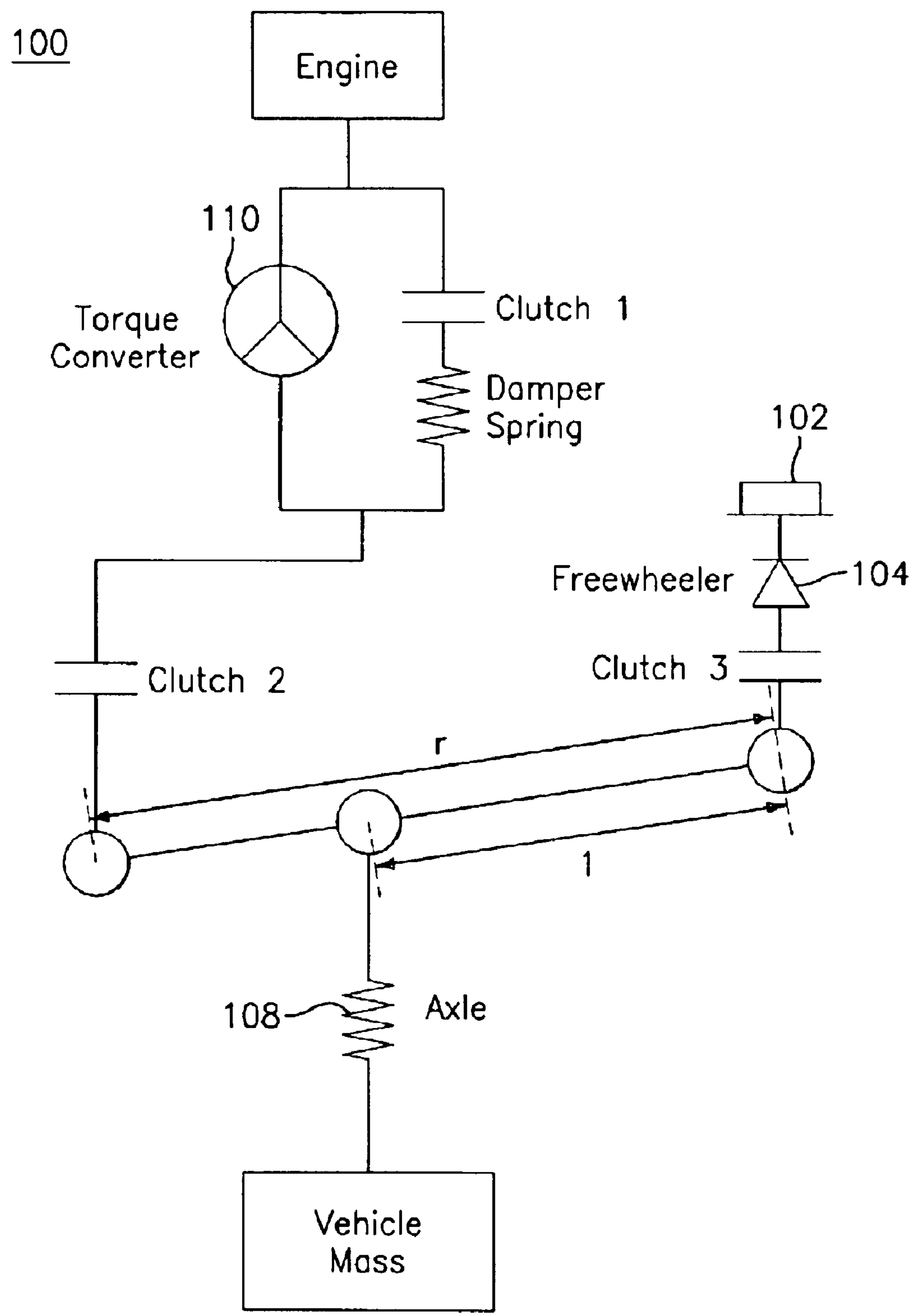
FIGS. 1*a* and 1*b* are schematic diagrams of an existing automatic transmission system in which range clutches are provided with freewheeler devices in a freewheeler-to-clutch shift configuration.
Figure 1B:
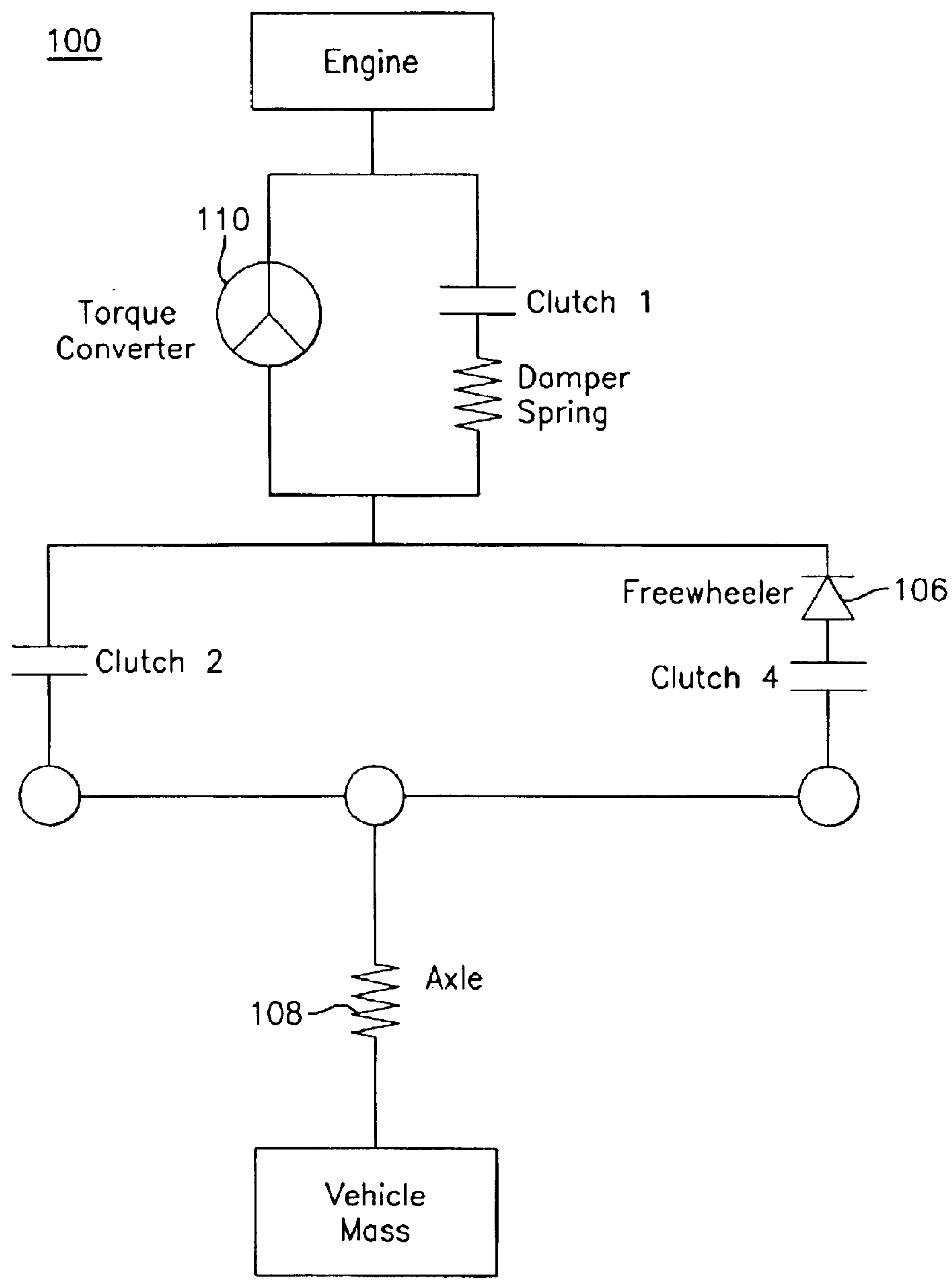
Figure 2:
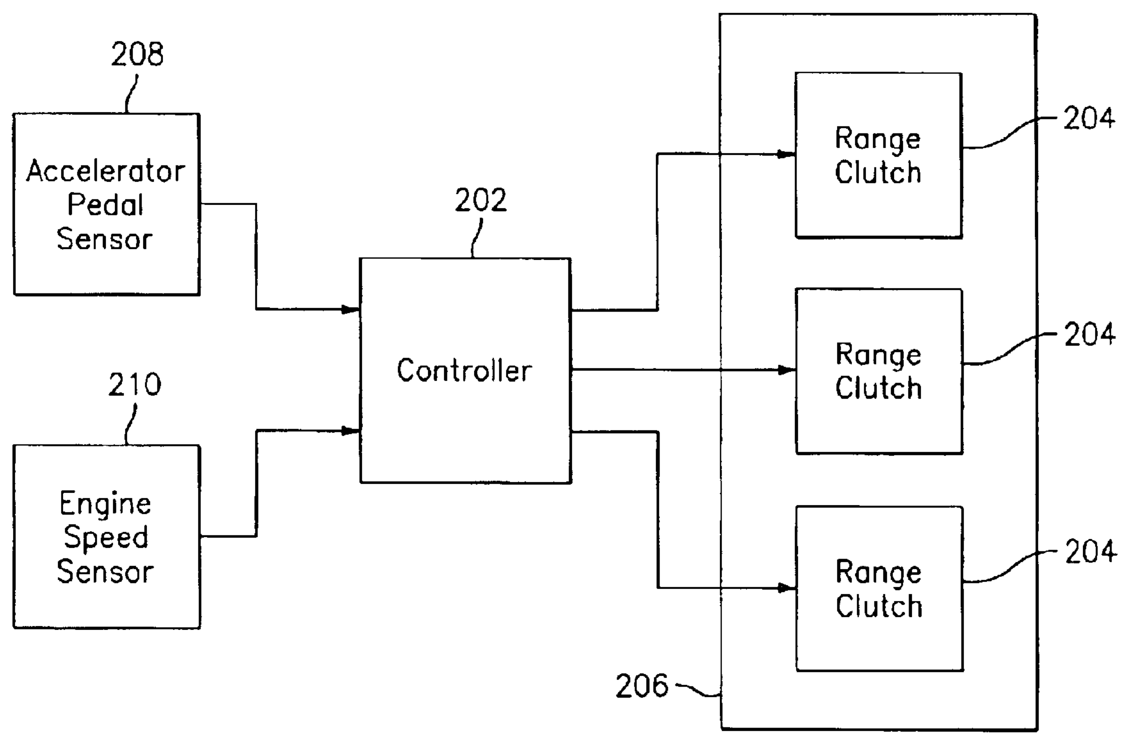
FIG. 2 is a schematic block diagram illustrating an exemplary system for reducing oscillation in an automotive transmission, in accordance with an embodiment of the invention.

Referring initially to FIG. 2, there is shown a schematic block diagram illustrating an exemplary system 200 for reducing oscillation in an automotive transmission, suitable for use in accordance with an embodiment of the invention. The system 200 includes a processor-based controller 202 that is capable of providing a pressure control signal to each of a plurality of range clutches 204 within an automotive transmission 206. The controller 202 receives sensor signals from both an accelerator pedal position sensor 208 and an engine speed sensor 210. As is described in further detail hereinafter, the controller 202 includes one or more control algorithms that selectively adjust the range clutch pressure of a selected range clutch in response to a detected tip-out condition from the accelerator pedal sensor 208.

Figure 3:
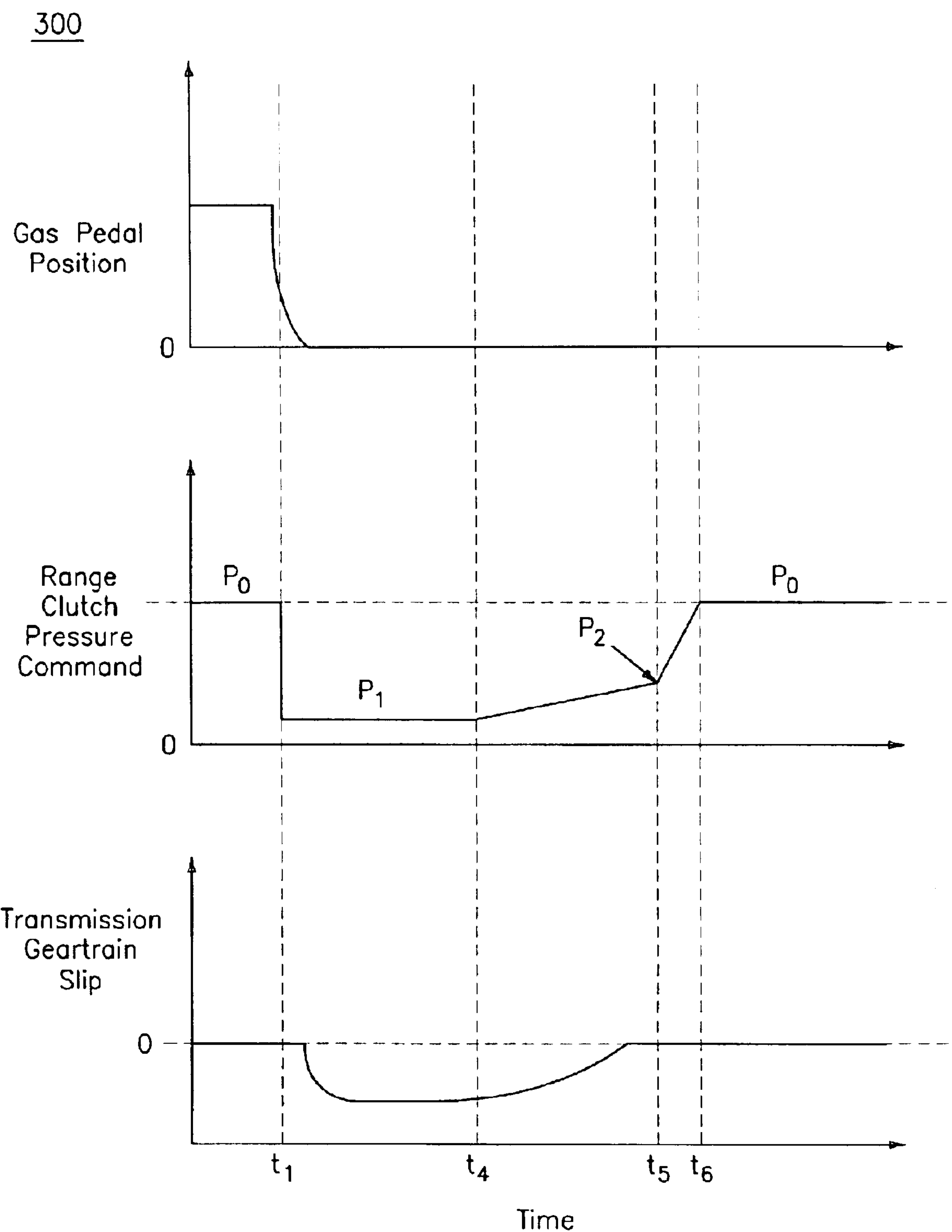
FIGS. 3 and 4 are timing diagrams illustrating a method for reducing oscillation in an automotive transmission, in accordance with an embodiment of the invention.

Referring now to FIG. 3, there is shown a timing diagram 300 that illustrates the operation of the present method subsequent to a detected tip-out condition. The upper graph in the timing diagram 300 depicts the accelerator pedal position, wherein a "0" value represents the pedal in a fully released position. The middle graph in timing diagram 300 depicts the resulting applied range clutch pressure command, while the lower graph represents the associated transmission geartrain slip as a result of the applied range clutch pressure. Prior to time $t_1$, the accelerator (gas) pedal is depressed by the vehicle driver to some positive displacement value. During this time, the range clutch pressure command (which may describe the pressure command to any of the range clutches 204 shown in FIG. 2, for example) is at its fully engaged value, $P_0$, as may be the case during a normal operation. Accordingly, there is no geartrain slippage prior to time $t_1$, as reflected in the lower graph of FIG. 3.

Then, at time $t_1$, a tip-out condition occurs as is reflected by the sudden change in gas pedal position to the fully released position. As stated previously, the lack of a mechanical freewheeler associated with a given range clutch, coupled with the sudden decrease in engine torque can lead to undesirable driveline oscillation. Thus, in accordance with the present method, the range clutch pressure is immediately commanded from the fully engaged clutch pressure (denoted as $P_0$) to be decreased to a prescribed minimum value ($P_1$) to generate a controlled slippage of the clutch. This effective clutch slip, $\Delta\omega$, is defined by the expression:

$$\Delta\omega=\omega_i-r\times\omega_0$$

wherein $\omega_i$ is the transmission input speed, r is the designed transmission input/output speed ratio, and $\omega_0$ is the transmission output speed. Preferably, the slip is equal to zero when both range clutches are fully engaged. The particular value chosen for $P_1$ will depend on the preload (i.e., return spring pressure) on the clutch. However, the $P_1$ value should not be too low so as to create too much clutch slip, which could result in excitation of the driveline dynamics once the range clutch is fully reengaged. Likewise, if the $P_1$ value is too high, there will be insufficient slippage such that the range clutch will not be effective in isolating the abrupt engine torque decrease. The reduced clutch pressure is maintained at $P_1$ until time $t_4$ (the designations $t_2$ and $t_3$ are used in the next figure), at which time the input torque disturbance due to the tip-out action has died down. Then, the method begins to increase the range clutch pressure to an intermediate, higher value $P_2$ in order to slowly decrease the clutch slip (i.e., begin to reengage the clutch) without exciting the driveline.

The particular pressure command value of $P_2$ is predetermined to be high enough to reengage the clutch under the coasting condition. Once the range clutch pressure command has reached $P_2$ at time $t_5$ (and after which time the clutch has reengaged, as seen by the return of the slip curve to 0), the pressure is further increased back to the fully engaged clutch pressure $P_0$ at time $t_6$, thereby providing full clutch lockup for maximum engine torque.

Figure 4:
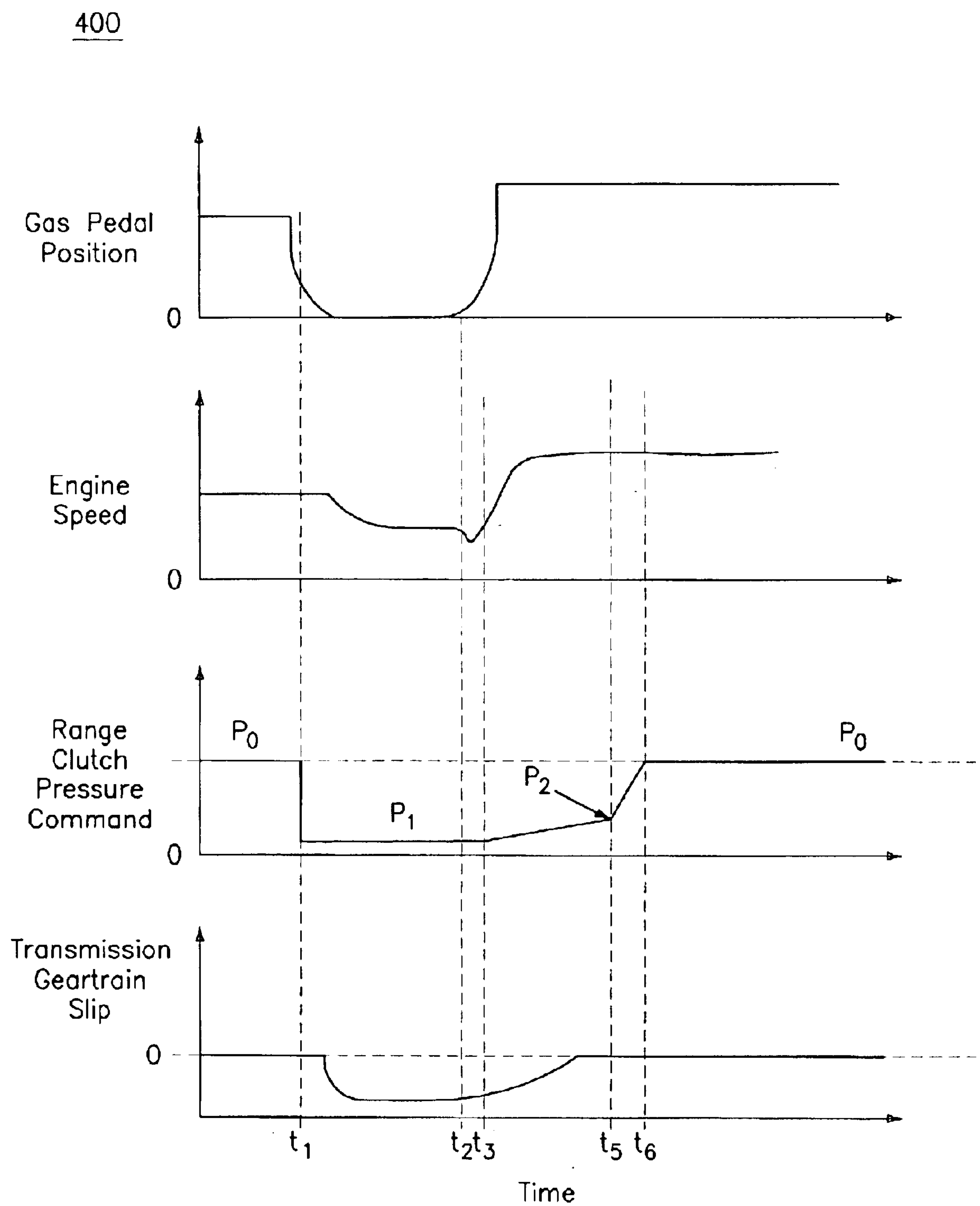

Referring now to FIG. 4, there is shown another timing diagram 400 that illustrates the further operation of the present method subsequent to a detected tip-in condition, which follows an initial tip-out condition. In other words, FIG. 4 illustrates the algorithm performance when a gas pedal tip-in is detected during the process of range clutch pressure modification (i.e., during the $P_1$ control period discussed above). As was the case in FIG. 3, an initial tip-out is detected at time $t_1$, after which the range clutch pressure command is reduced from the full normal value $P_0$ to the reduced $P_1$ value. It will be noted that the timing diagram of FIG. 4 also illustrates an engine speed curve, the purpose of which will become apparent.

However, in this example, a tip-in is detected at time $t_2$ when the range clutch is still commanded to be at $P_1$ pressure. This is seen most particularly through the upper graph (gas pedal position) of FIG. 4. In such an event, the method is designed to begin increasing the range clutch pressure only after the engine speed is detected to be higher than the engine speed at the instant the tip-in was detected (at time $t_2$) by some preset amount. This is done in order to allow enough time for the driveline to change from negative torque (engine coast mode) to positive torque (engine power mode) before re-applying the clutch pressure to prevent from exciting the driveline. As shown in the engine speed graph portion of FIG. 4, the engine speed experiences a slight dip immediately after tip-in at time $t_2$. Thus, there is no immediate increase in the range clutch pressure command. However, as the engine speed begins to increase as a result of the depressed accelerator pedal, it will eventually exceed the speed value detected at time $t_2$. When the engine speed exceeds the value from time $t_2$ by a determined amount, the method will then begin to increase the range clutch pressure command from $P_1$ to $P_2$. This event occurs at time $t_3$. In addition, the particular rate of pressure signal increase from $P_1$ to $P_2$ is preferably dependent on the actual gas pedal position in order to prevent engine flaring.

Once initiated, the pressure signal increase from $P_1$ to $P_2$ is similar to that demonstrated in FIG. 3. Again, the particular point in time at which $P_2$ is reached ($t_5$ in this instance) occurs after the gear train slip has returned to zero. Finally, the range clutch pressure signal will be increased at a faster rate back to $P_0$ between time $t_5$ and time $t_6$.

Still another possibility is the detection of a tip-in condition during a pressure increasing period (e.g., from $P_1$ to $P_2$ or from $P_2$ to $P_0$). In such a case, the method will simply increase the range clutch pressure signal at a rate depending on the gas pedal position, and without any waiting period. Moreover, if there is a gearshift during the tip-out range clutch control period, the gearshift control algorithm will override the range clutch control algorithm of the present method to avoid any interference with the shifting operation.

Referring generally now to FIGS. 5–14, there are shown a series of flow diagrams illustrating a variety of algorithm subroutines implemented by the above described method, in accordance with a further aspect of the invention. The algorithm subroutines depicted in the flow diagrams may be representative of computer program instructions executed by the processor-based controller 202 in carrying out the control aspects of this disclosure. Beginning in FIG. 5, a main control loop 500 is repeatedly and sequentially executed during operation of the vehicle, such as every 5 milliseconds, for example. An initialization block 502 sets each of the system parameters to their initial conditions and prepares the controller 202 for operation. Then, the engine mode (more specifically, an updated engine mode status) is determined in block 504, and is set forth in greater detail in FIG. 6. In block 506, the existing transmission control functions of a conventional automatic transmission system are performed. As the conventional transmission functions (e.g., shifting) are well known in the art, the details thereof are not discussed in further detail hereinafter, except as they relate to the specific aspects of the present disclosure. Then, as shown in block 508, the range clutch override functions, described above, are performed. The individual subroutines for each aspect of this general control function are now described in greater detail as follows.

Figure 5:
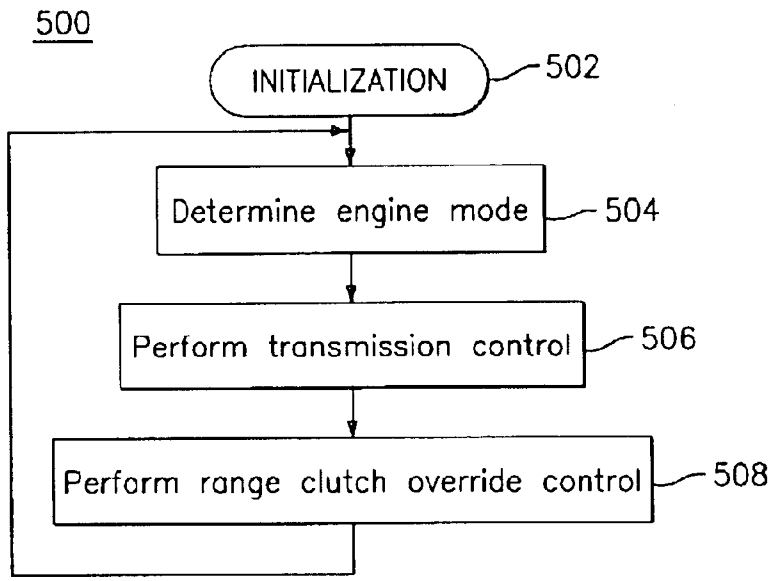
FIGS. 5–14 are flow diagrams illustrating various subroutines executed by the method illustrated in FIGS. 3 and 4.
Figure 6:
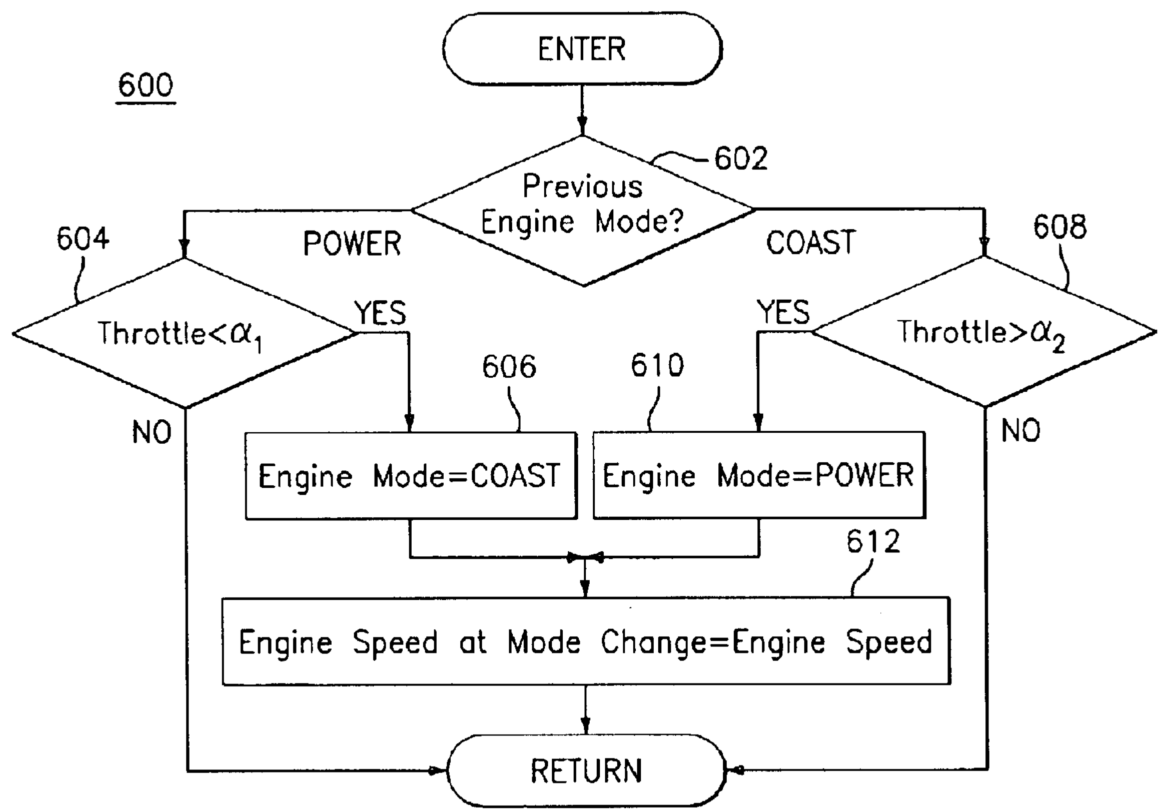

FIG. 6 illustrates a subroutine 600 the algorithm for determination/updating of the engine mode (either "POWER" or "COAST"), as was generally set forth in block 504 of FIG. 5. At decision block 602, the subroutine 600 determines the previous recorded engine mode. Regardless of which mode was previously recorded, the subroutine 600 will check to see whether the mode has been changed and, if so, will record the engine speed for a mode change. If the existing engine mode is "POWER", subroutine 600 proceeds to decision block 604 to see whether the accelerator pedal (i.e., throttle) position is less than a first threshold value, $\alpha_1$. For example, $\alpha_1$ may be set at some percentage value, such as 1% of the total depress range of the pedal. Then, if the throttle position is less than $\alpha_1$, the engine is now in a COAST mode and is set as such in block 606. If not, then there is no change in engine mode status, and subroutine 600 returns to the main control loop 500.

Conversely, if the engine mode is initially recorded as "COAST", subroutine 600 alternatively proceeds to decision block 608 to see whether the throttle position is greater than a second threshold value, $\alpha_2$, (e.g., 2% of the total pedal depress range). Such a condition is indicative that the engine is now in a POWER mode, and is set as such in block 610. Again, if there is no change from the COAST mode, then the subroutine 600 exits. On the other hand, if the engine mode has changed from COAST to POWER, or vice versa, then the engine speed is recorded and updated, as shown at block 612 before the subroutine 600 is completed.

Figure 7:
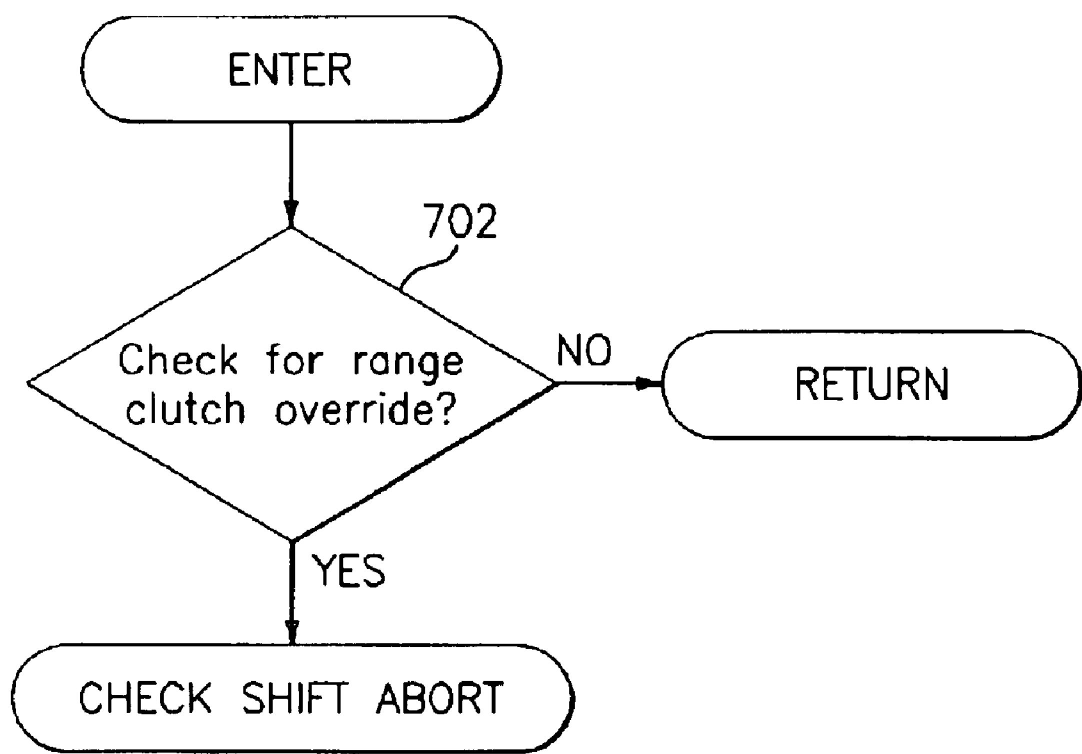

FIG. 7 illustrates a first inquiry subroutine 700 of the general range clutch override algorithm (block 508 of FIG. 5). Essentially, a determination is made, using transmission operating conditions, whether the remainder of the range clutch override control algorithm is to be executed. For example, if the PRNDL shift lever is in P (Park) or N (Neutral), then the algorithm does not need to be executed. However, if the PRNDL switch is in D (Drive) and the vehicle is moving in a forward gear, then the algorithm is executed. Thus, at decision block 702, it is determined whether the algorithm is to continue, based on the transmission operating conditions. If the answer is NO, then the inquiry subroutine 700 exits back to the main control loop 500; if the answer is YES, then the algorithm proceeds to subroutine 800, entitled "CHECK SHIFT ABORT". This subroutine is illustrated in FIG. 8.

Figure 8:
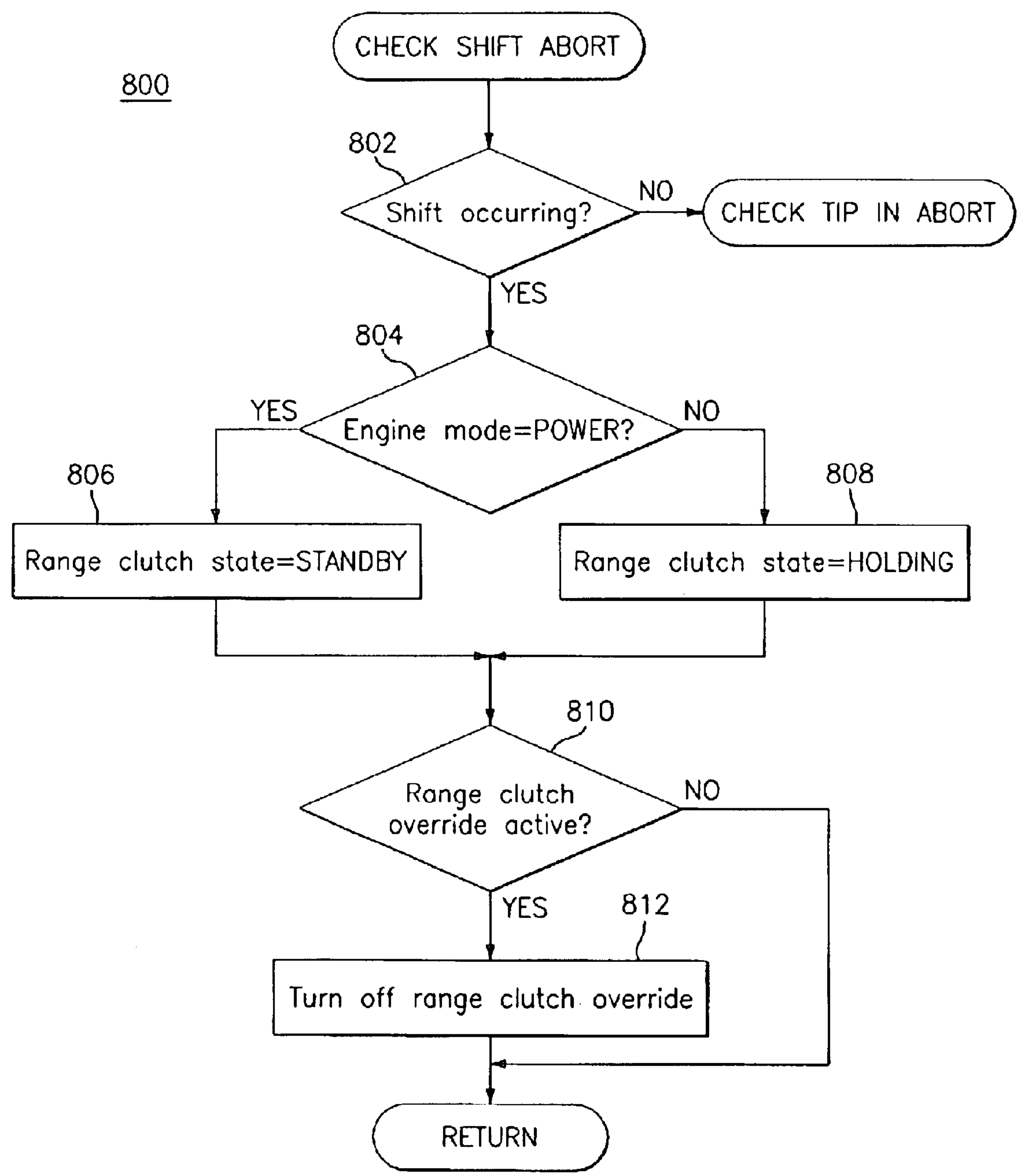

Briefly stated, the subroutine 800 of FIG. 8 is used to determine whether an in-progress range clutch override (slip adjustment) should be canceled due to an upcoming requested shift occurring in the normal operation of the transmission. Thus, subroutine 800 first determines at decision block 802 whether a shift is occurring. If not, then the algorithm immediately exits subroutine 800 and proceeds to the next subroutine 900 of the range clutch algorithm. However, if it is determined that a shift is occurring, then the subroutine 800 will ultimately exit and return to the main control loop. Before doing so, however, it will first check to see whether there is an in-progress range clutch override operation that should be canceled.

In that regard, it is first determined at decision block 804 whether the present engine mode is POWER. If the engine mode is POWER, then a parameter entitled "range clutch state", reflective of the pressure status of the range clutch, is assigned a value of STANDBY at block 806, which corresponds to a normal operating mode of the range clutch. If the engine mode is not POWER (i.e., engine mode=COAST), then the range clutch state is assigned a value of HOLDING, at block 808. The value HOLDING corresponds to the range clutch pressure being held at its present value. Once the range clutch pressure state is assigned either as HOLDING or STANDBY, subroutine 800 proceeds to decision block 810. If a range clutch override operation is in progress, it is immediately cancelled at block 812 before subroutine 800 is exited. If not, the subroutine 800 is exited with no further action taken.

Figure 9:
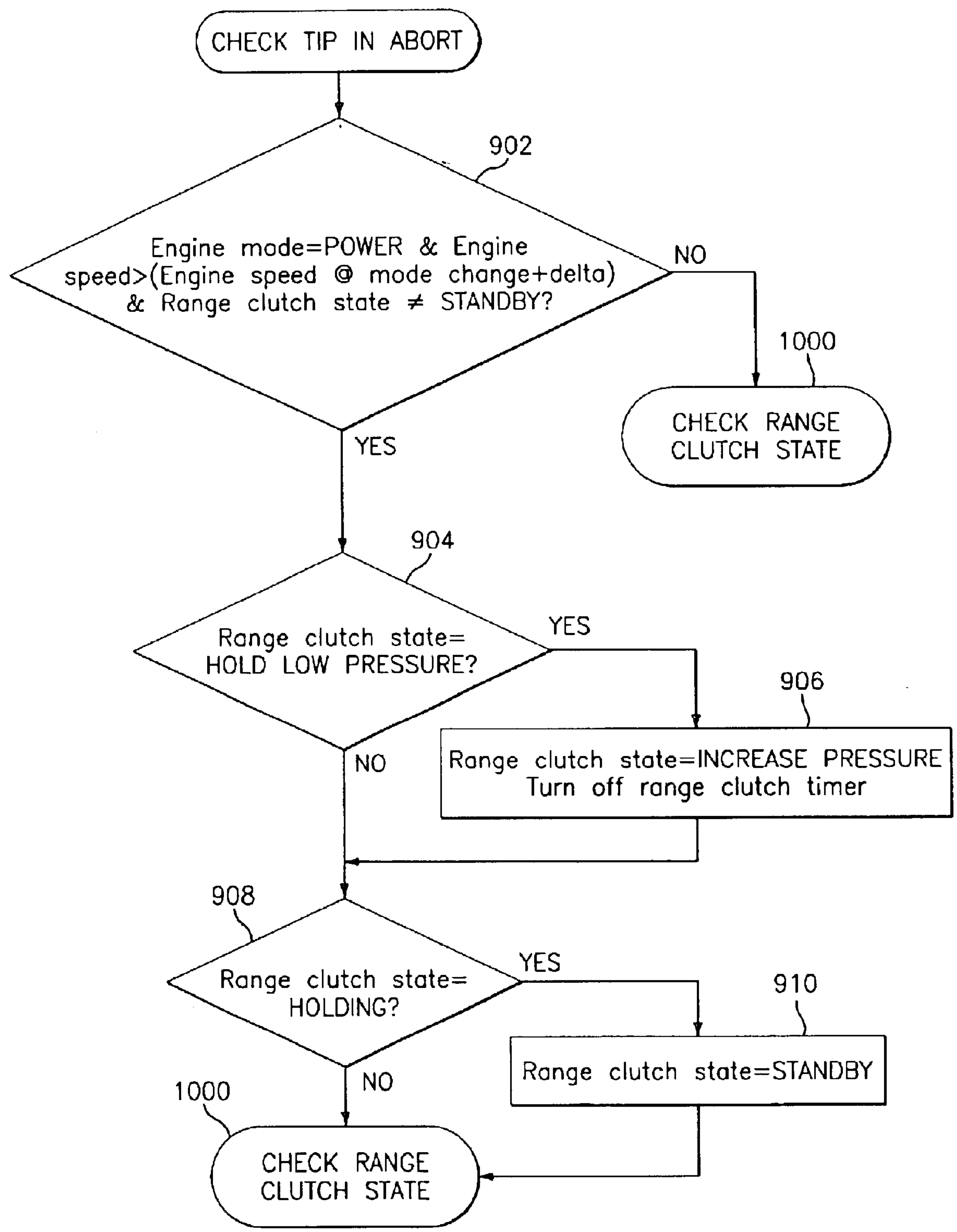
Figure 10:
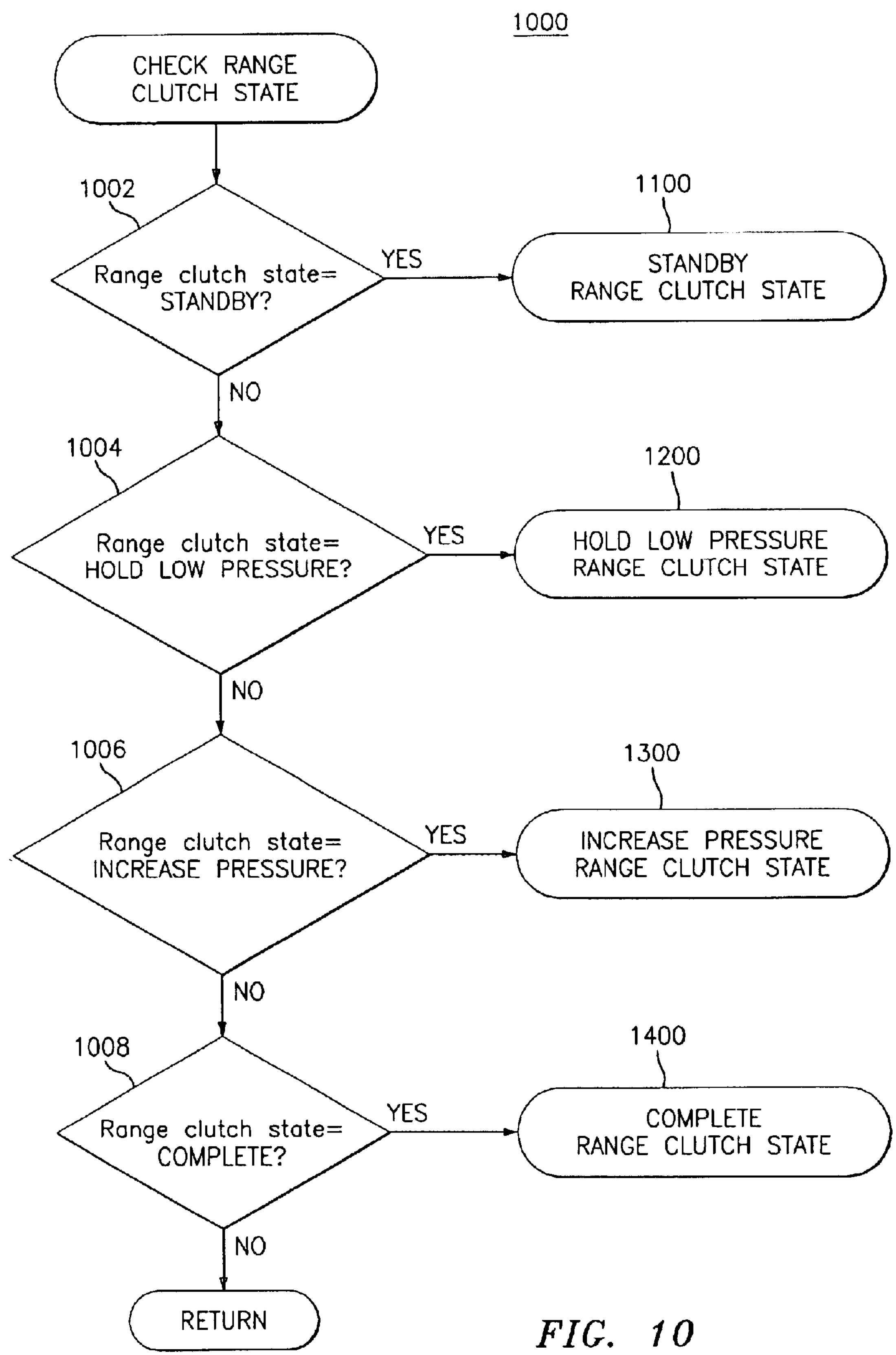

Referring now to FIG. 9, there is shown another subroutine 900 of the range clutch algorithm. Similar to subroutine 800, subroutine 900 is another "abort" subroutine, in that it also checks to see whether an in-progress range clutch override operation should be cancelled. However, in this instance, subroutine 900 is checking for a tip-in condition as opposed to a transmission shift. The tip-in condition is reflected by the inquiry of decision block 902, in which it is determined: whether (1) the engine mode is POWER; and (2) whether the present engine speed is greater than the engine speed recorded at the last mode change plus the preset amount (delta), as discussed earlier in reference to FIG. 4; and (3) whether the range clutch state is not equal to STANDBY (i.e., normal operating mode). If any of these conditions are not met, then subroutine 900 immediately proceeds to subroutine 1000.

If, however, the result of decision block 902 is YES (a tip-in exists), then subroutine 900 will modify the value of range clutch state in order to expedite a return to the STANDBY state wherein the range clutch pressure is set back to its normal operating pressure. In this instance, subroutine 900 proceeds to decision block 904 to determine whether the present value of range clutch state is equal to HOLD LOW PRESSURE. This value signifies that the range clutch pressure command is at the minimum slip value, $P_1$, as will be recalled from FIGS. 3 and 4. If that is the case, range clutch state will then be reassigned to the value of INCREASE PRESSURE (which reflects the gradual increase of the range clutch pressure command from $P_1$ to $P_2$), as shown in block 906. Furthermore, a range clutch timer is turned off, wherein the timer is otherwise used to set the amount of time the range clutch pressure command is held at $P_1$ during an uninterrupted gear train slip. At decision block 908, it is determined whether the present range clutch state is HOLDING and, if so, the range clutch state is reassigned to STANDBY as shown in block 910.

Regardless of whether there is a tip-in condition detected, the algorithm will continue on to execute a specific function (s) depending on the current value of range clutch state. This check is accomplished by the subroutine 1000, illustrated in FIG. 10. As can be seen, subroutine 1000 comprises a sequence of inquiries (decision block 1002, 1004, 1006, 1008) as to the assigned value of range clutch state. Depending on which of the values of range clutch state is found, the algorithm will proceed to a final corresponding subroutine (1100, 1200, 1300, 1400). It will be noted that the value of range clutch state entitled COMPLETE, in decision block 1008, refers to the rapid increase in range clutch pressure from $P_2$ to $P_0$ between time $t_5$ and time $t_6$ as exemplified in FIG. 4.

Figure 11:
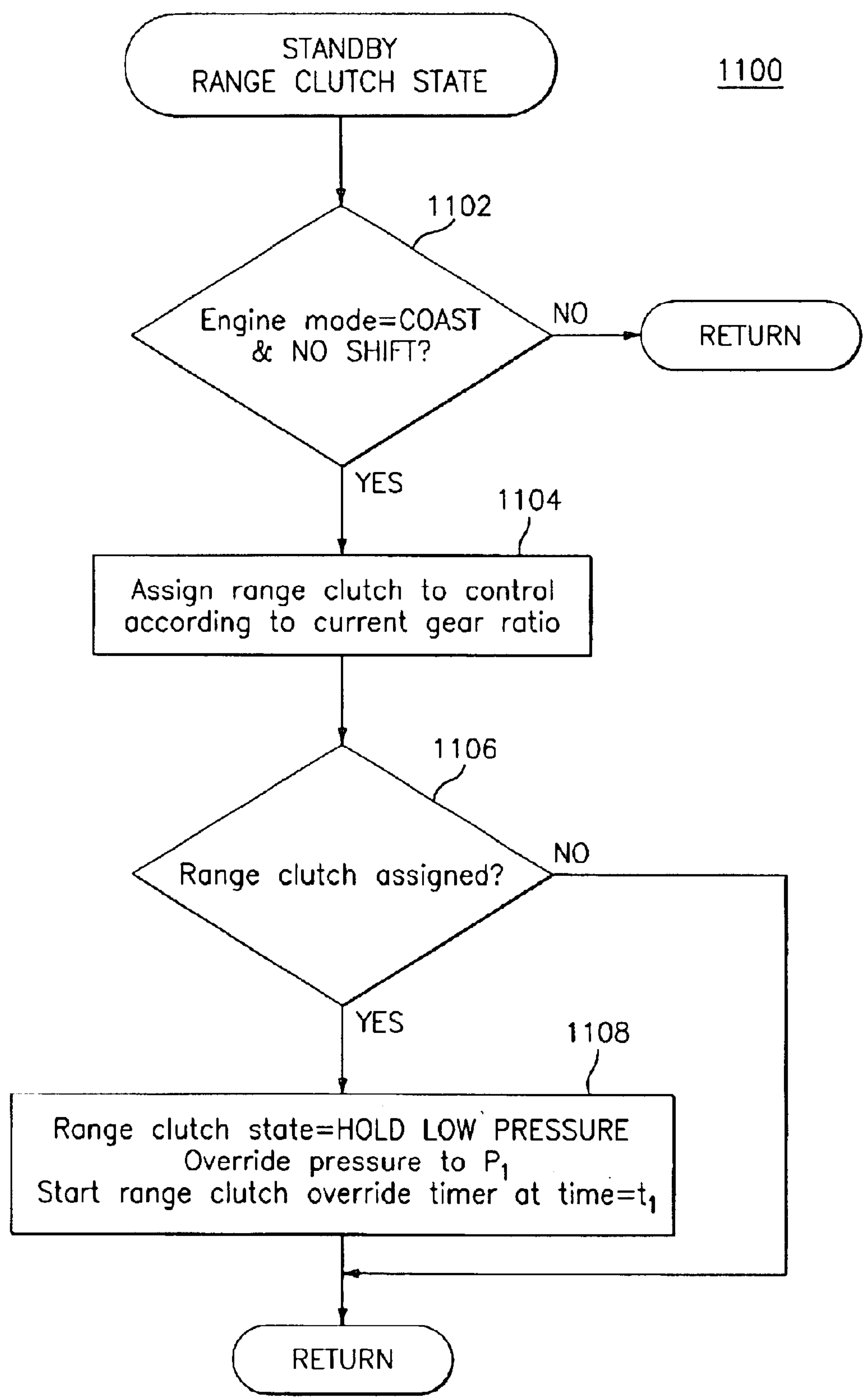

FIG. 11 illustrates the subroutine 1100 executed when the range clutch state equals STANDBY. First, decision block 1102 verifies whether the conditions to start a range clutch override are satisfied. Namely, if the engine mode is in coast and no shifting is taking place, then subroutine 1100 selects a particular range clutch within the transmission to be controlled, as shown in block 1104. This selection will depend upon the current gear ratio of the transmission. With certain gears, a range clutch override operation may not be desired (e.g., if a freewheeler is active in that gear). Thus, decision block 1106 will further verify whether a range clutch has been selected. If not, the subroutine will exit. Otherwise, the range clutch state is set to HOLD LOW PRESSURE, as shown in block 1108. In addition, the range clutch pressure is set to $P_1$ and the range clutch override timer is started.

Figure 12:
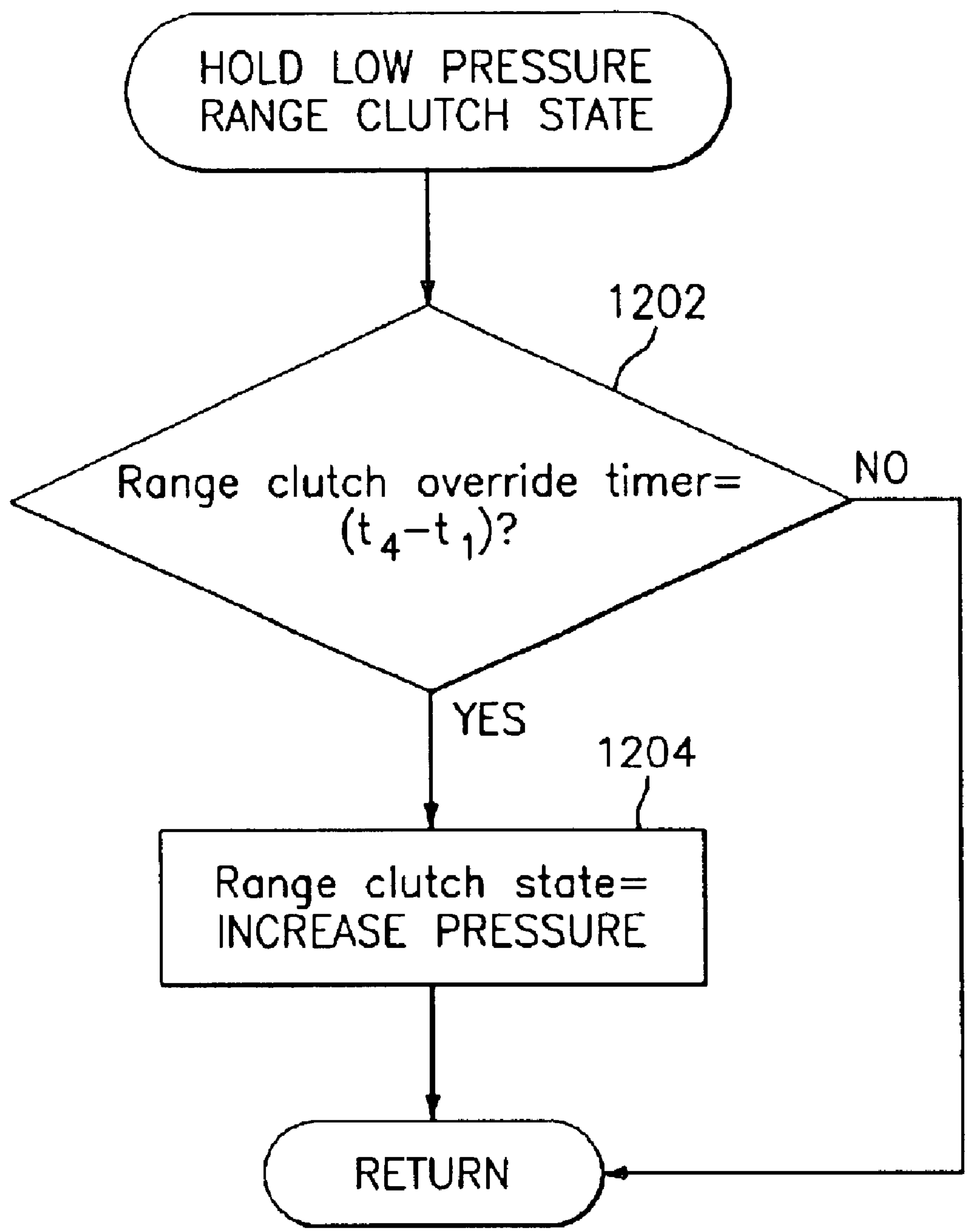

FIG. 12 illustrates the subroutine 1200 executed when the range clutch state equals HOLD LOW PRESSURE. A check is made at decision block 1202 to see whether the range clutch pressure has been held at $P_1$ for the predetermined time represented by $(t_4-t_1)$. If not, then there is no change in the value of the range clutch state, meaning that the pressure will be held at $P_1$ barring an intervening action. If the predetermined amount of time has passed, then the range clutch state is set to INCREASE PRESSURE at block 1204.

Figure 13:
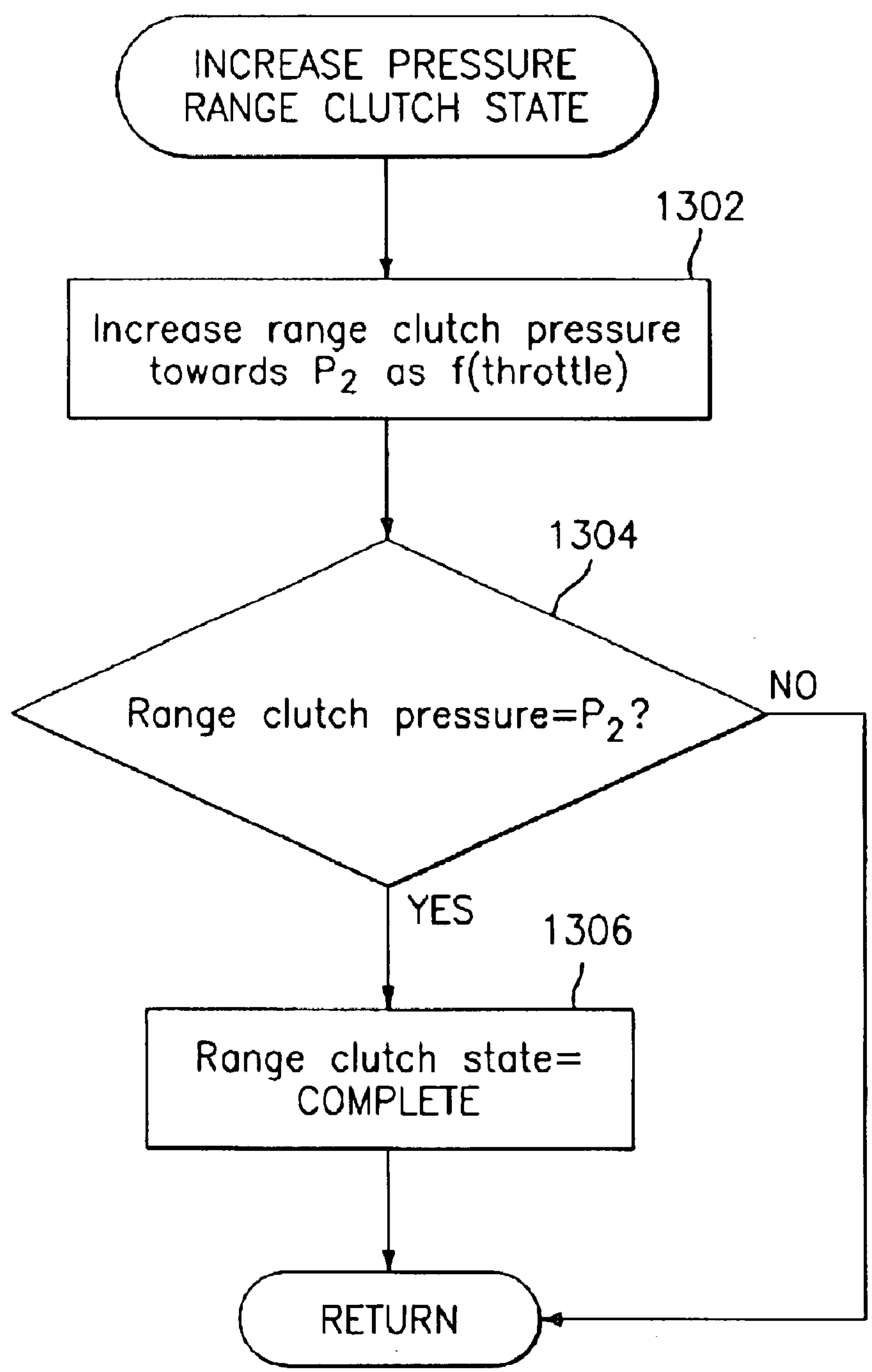

Referring now to FIG. 13, there is shown the subroutine 1300 executed when the range clutch state equals INCREASE PRESSURE. At block 1302, the range clutch pressure is increased in a manner that depends on the throttle position in approaching pressure $P_2$. If the range clutch pressure has been increased to $P_2$, as determined at decision block 1304, then the range clutch state is set to COMPLETE at block 1306, otherwise the subroutine 1300 exits at that point without the range clutch state being changed.

Figure 14:
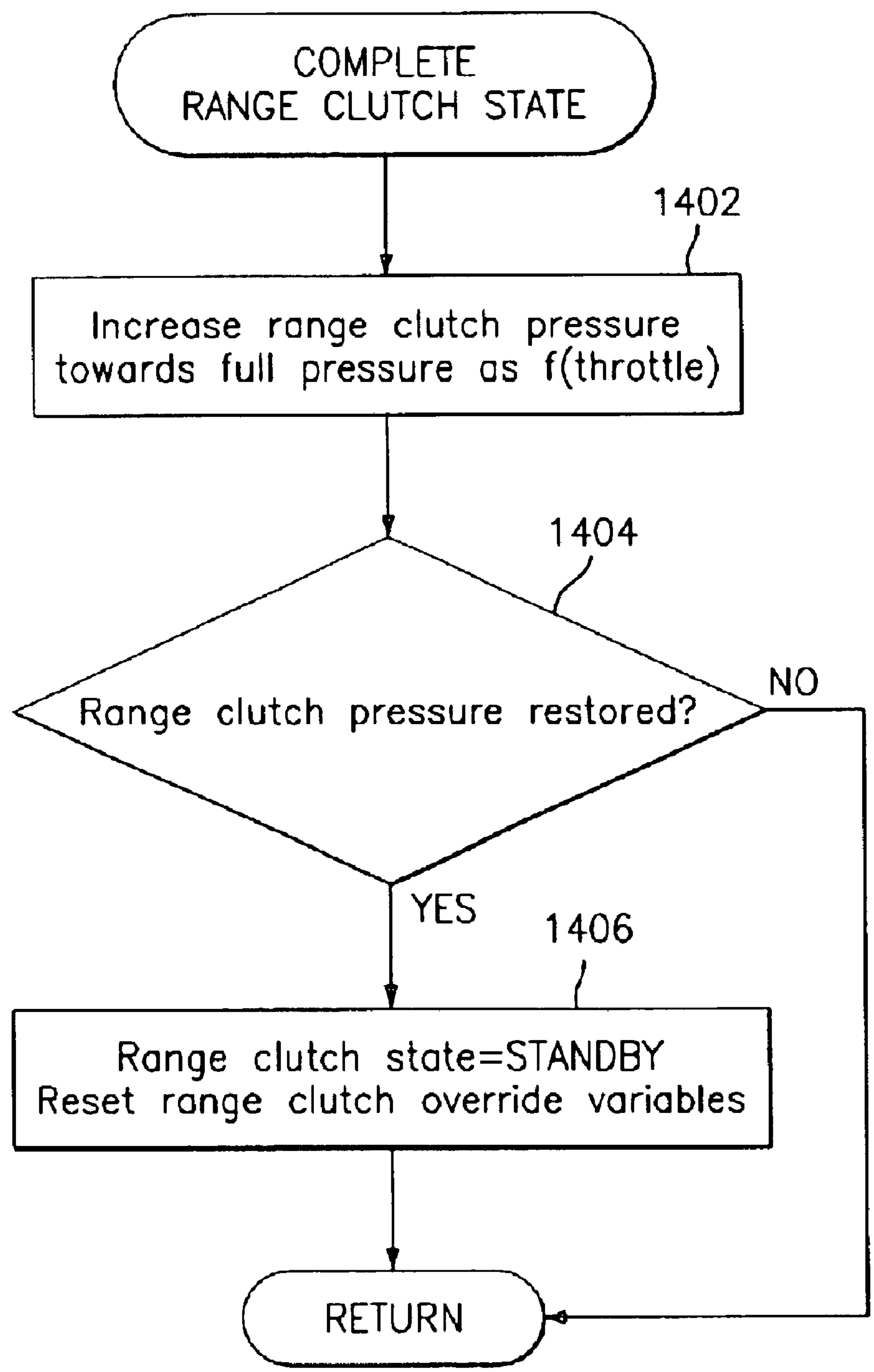

Finally, FIG. 14 illustrates the subroutine 1400 executed when the range clutch state equals COMPLETE. Once again, this condition represents the case when the gear train slip has been returned to zero and it is time for the full clutch pressure to be restored. Accordingly, at block 1402, the range clutch pressure is increased in a manner dependent on the throttle position. If at decision block 1404 the range clutch pressure has not been restored to the normal range clutch pressure value, then the subroutine exits. If the normal range clutch pressure has been restored, the range clutch state is set to STANDBY at block 1406, and the range clutch override variables are reset.

Figure 15:
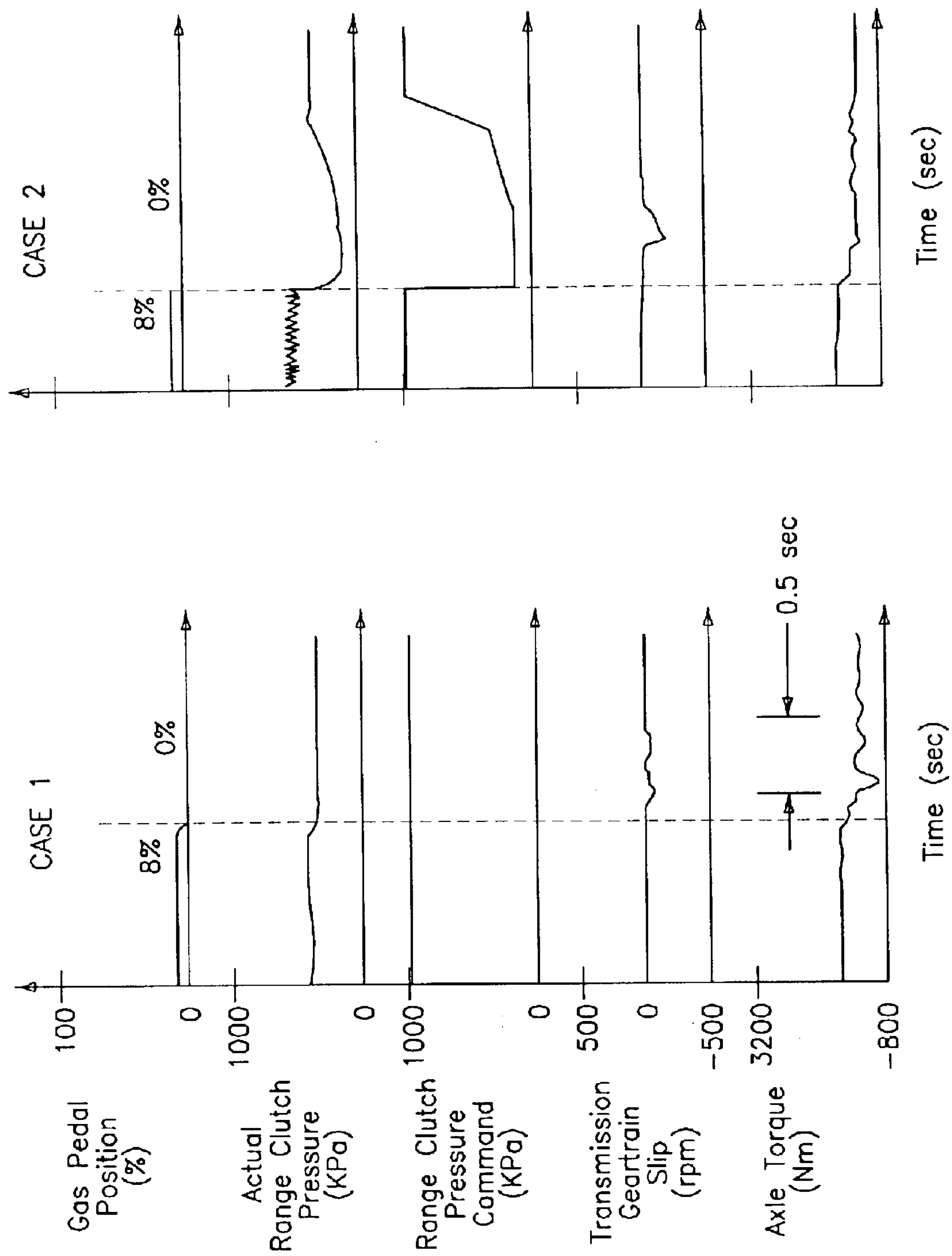
FIGS. 15 and 16 are timing diagrams illustrating performance comparison results of the method illustrated in FIGS. 3–14.
Figure 16:
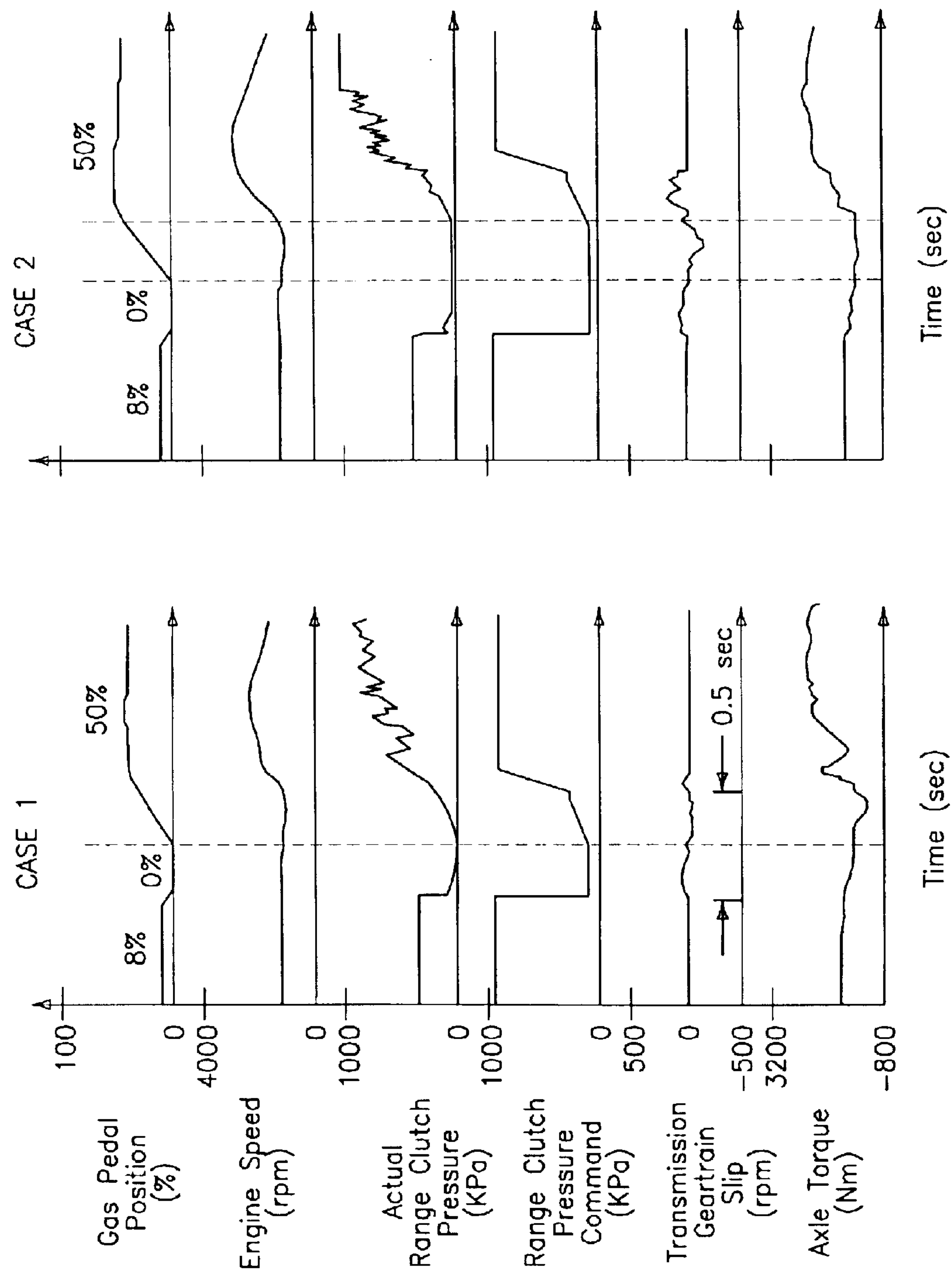

A performance comparison of the operation of the present method is set forth in the examples of the timing diagrams shown in FIGS. 15 and 16. In particular, FIG. 15 illustrates the gas pedal position, actual range clutch pressure, range clutch pressure command, clutch slip, and axle torque vs. time traces of test vehicle data when the gas pedal is tipped-out from 8% to 0% in second gear at a speed of 12 mph. As shown in the "case 1" timing diagram, there is essentially no variation in actual range clutch pressure and transmission gear slip, following the tip-out, since the above described method is not implemented here. However, as can also be seen, there is a significant drop in axle torque and some subsequent driveline oscillation following the tip-out, because the transmission geartrain is locked and the driveline is thus excited by the sudden decrease of the engine torque due to the tip-out action. On the other hand, in the "case 2" timing diagram (which reflects the implementation of the method), the axle torque response is smooth when one of the range clutch pressures is actively controlled as described above to isolate the sudden decrease of the engine torque. Again, this active control is reflected by the initial decrease in actual range clutch pressure and gear train slip, followed by a gradual increase back to the normal pressure, wherein the pressure is increased more rapidly once the gear train slip is returned to zero.

Lastly, FIG. 16 illustrates the performance comparison of a subsequent tip-in following an initial tip-out condition. It will be noted that "case 1" reflects an example of system performance when only tip-out is taken into consideration. Both cases depict the gas pedal position, engine speed, actual range clutch pressure, range clutch pressure command, clutch slip, and axle torque vs. time traces of the test vehicle data when the gas pedal is tipped-out from 8% to 0% and then subsequently tipped-in to 50% in second gear at 12 mph. In case 1, the range clutch pressure was increased when the gas pedal tip-in was detected after the tip-out maneuver. However, the axle torque demonstrates a significant drop since the range clutch pressure was increased too early. In contrast, case 2 exemplifies the application of the method as detailed in FIG. 4 by delaying the increase of range clutch pressure until the engine speed has increased by more than a preset value. This results in both a smooth tip-out and tip-in response.

It will thus be appreciated that by selectively modifying the range clutch pressure so as to allow a controlled gear train slip, the function of an equivalent freewheeler device may be attained. Not only is the method responsive to a tip-out condition, it is also responsive to a subsequent tip-in of the accelerator pedal so as not to return the range clutch pressure to normal too quickly and excite the driveline.

As will also be appreciated, the disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, flash EEPROM or any other computer-readable storage medium, wherein, when the computer program code is loaded into and executed by a computer or controller, the computer becomes an apparatus for practicing the invention. The present invention may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing oscillation in an automotive transmission system, the method comprising:

detecting a tip-out of an accelerator pedal position;

responsive to said detected tip-out, adjusting a pressure command for a selected range clutch within the transmission system so as to reduce the pressure of said selected range clutch from a normal pressure level to a low pressure level, thereby producing a desired gear train slip in the transmission system; and re-adjusting said pressure command of said selected range clutch after a determined period of time at said low pressure level so as to increase the pressure of said selected range clutch from said low pressure level, and thereby eliminating said gear train slip.

2. The method of claim 1, further comprising:

following said determined period of time at said low pressure level, increasing said pressure command at a first rate so as to increase the pressure of said selected range clutch from said low pressure level to an intermediate pressure level between said low pressure level and said normal pressure level, said intermediate pressure level being sufficient to eliminate said gear train slip.

3. The method of claim 2, further comprising:

increasing said pressure command at a second rate so as to increase the pressure of said selected range clutch from said intermediate pressure level to said normal pressure level.

4. The method of claim 2, further comprising:

determining whether a tip-in of said accelerator pedal position is detected subsequent to said detected tip-out; and responsive to a detected tip-in following said detected tip-out, delaying said increasing said pressure command at a first rate until an engine speed in the transmission system exceeds a predetermined value.

5. The method of claim 4, wherein said predetermined value of said engine speed is equal to a recorded engine speed taken at the time said tip-in is detected, plus a constant value.

6. The method of claim 5, further comprising determining a present engine mode, said present engine mode reflective of said accelerator position.

7. The method of claim 6, wherein said present engine mode comprises one of a coast mode or a power mode.

8. The method of claim 7, wherein if it determined that said present engine mode has changed from a previous engine mode, then said recorded engine speed is updated.

9. A system for reducing oscillation in an automotive transmission system, comprising:

sensing means for detecting a tip-out of an accelerator pedal position;

a controller for adjusting a pressure command for a selected range clutch within the transmission system, in response to said detected tip-out, so as to reduce the pressure of said selected range clutch from a normal pressure level to a low pressure level, thereby producing a desired gear train slip in the transmission system; and said controller re-adjusting said pressure command of said selected range clutch after a determined period of time at said low pressure level so as to increase the pressure of said selected range clutch from said low pressure level, and thereby eliminating said gear train slip.

10. The system of claim 9, wherein:

following said determined period of time at said low pressure level, said controller increases said pressure command at a first rate so as to increase the pressure of said selected range clutch from said low pressure level to an intermediate pressure level between said low pressure level and said normal pressure level, said intermediate pressure level being sufficient to eliminate said gear train slip.

11. The system of claim 10, wherein:

said controller increases said pressure command at a second rate so as to increase the pressure of said selected range clutch from said intermediate pressure level to said normal pressure level.

12. The system of claim 10, wherein:

said controller determines whether a tip-in of said accelerator pedal position is detected subsequent to said detected tip-out; and responsive to a detected tip-in following said detected tip-out, said controller further delays said increasing said pressure command at a first rate until an engine speed in the transmission system exceeds a predetermined value.

13. The system of claim 12, wherein said predetermined value of said engine speed is equal to a recorded engine speed taken at the time said tip-in is detected, plus a constant value.

14. The system of claim 13, wherein said controller determines a present engine mode, said present engine mode reflective of said accelerator position.

15. The system of claim 14, wherein said present engine mode comprises one of a coast mode or a power mode.

16. The system of claim 15, wherein if said controller determines that said present engine mode has changed from a previous engine mode, then said recorded engine speed is updated.

* * * * *